(12) United States Patent
Jagiella et al.

(10) Patent No.: US 11,500,398 B2
(45) Date of Patent: Nov. 15, 2022

(54) INTELLIGENT SAFETY VALVE AND CONTROL METHOD OF AN INTELLIGENT SAFETY VALVE

(71) Applicant: Endress+Hauser Conducta GmbH+Co. KG, Gerlingen (DE)

(72) Inventors: Manfred Jagiella, Notzingen (DE); Detlev Wittmer, Maulbronn (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 7 days.

(21) Appl. No.: 17/129,312

(22) Filed: Dec. 21, 2020

(65) Prior Publication Data

US 2021/0223796 A1 Jul. 22, 2021

(30) Foreign Application Priority Data

Dec. 20, 2019 (DE) ...................... 10 2019 135 598.2

(51) Int. Cl.
*G05D 7/06* (2006.01)
*F16K 37/00* (2006.01)
(Continued)

(52) U.S. Cl.
CPC ......... *G05D 7/0623* (2013.01); *F16K 37/005* (2013.01); *G01N 27/333* (2013.01);
(Continued)

(58) Field of Classification Search
CPC ........... Y10T 137/0335; Y10T 137/034; Y10T 137/2499; Y10T 137/2509; G05D 11/139;
(Continued)

(56) References Cited

U.S. PATENT DOCUMENTS 3,554,710 A * 1/1971 Drummond ................ B01J 2/28
264/117
3,770,608 A * 11/1973 Kelch ................ G01N 27/4166
204/406

(Continued)

FOREIGN PATENT DOCUMENTS

CA        2129470 A1   2/1995
CN      105276367 A    1/2016
(Continued)

*Primary Examiner* — William M Mccalister
(74) *Attorney, Agent, or Firm* — Mark A. Logan; Endress+Hauser (USA) Holding, Inc.

(57) ABSTRACT

The invention relates to an intelligent safety valve comprising a valve body having a first valve inlet, a valve outlet and a first sensor compartment, the first sensor compartment including a first sensor assembly, the first sensor compartment being arranged in the valve body, a first closing unit suitable for closing the intelligent safety valve, an actuator mechanically connected to the first closing unit in order to close the first closing unit, and a control unit which is connected to the actuator and is suitable for controlling the actuator, wherein the control unit is connected to the first sensor assembly in order to evaluate sets of measured values from the first sensor assembly, and wherein the first sensor assembly comprises at least one analysis sensor, for example a pH sensor, a conductivity sensor or an oxygen sensor.

10 Claims, 2 Drawing Sheets

(51) Int. Cl.
*G08B 19/00* (2006.01)
*F16K 17/00* (2006.01)
*F16K 31/02* (2006.01)
*G01N 27/333* (2006.01)
*G08B 21/18* (2006.01)
*G01N 27/416* (2006.01)

(52) U.S. Cl.
CPC .......... *G05D 7/0635* (2013.01); *G08B 19/00* (2013.01); *G08B 21/182* (2013.01); *F16K 17/00* (2013.01); *F16K 31/02* (2013.01); *G01N 27/4167* (2013.01)

(58) Field of Classification Search
CPC ............ G05D 7/0623; F16K 11/00–24; F16K 37/005; F16K 31/02; F16K 17/00; G01N 27/333; G01N 27/3335; G01N 27/4167; G01N 27/28; G08B 19/00
USPC ............................................ 137/4, 5, 88–93
See application file for complete search history.

(56) References Cited

U.S. PATENT DOCUMENTS

| | | | | |
|---|---|---|---|---|
| 3,870,065 A * | 3/1975 | Minns, Jr. | ............ | G05D 11/138 137/5 |
| 4,315,518 A * | 2/1982 | Sawyer | ............... | C23C 18/1683 204/406 |
| 4,842,191 A * | 6/1989 | Bergmann | ......... | G05D 23/1393 236/12.12 |
| 5,412,616 A * | 5/1995 | Gonzalez | ........... | G05B 23/0291 367/13 |
| 5,647,391 A * | 7/1997 | Chan | .................... | G05D 11/138 137/5 |
| 6,056,001 A * | 5/2000 | Boyles | .................. | F16K 11/052 137/4 |
| 6,129,106 A * | 10/2000 | Kornelson | ........... | G05D 11/137 137/91 |
| 6,224,778 B1 * | 5/2001 | Peltzer | ..................... | C02F 1/008 210/101 |
| 6,561,217 B1 * | 5/2003 | Pan | ........................ | F16K 11/052 236/12.12 |
| 9,377,112 B2 * | 6/2016 | Pan | ........................ | F16K 11/052 |
| 9,746,857 B2 * | 8/2017 | Iversen | .................. | G05D 11/13 |
| 2003/0094196 A1 * | 5/2003 | Siefering | .......... | H01L 21/67086 137/93 |
| 2009/0007968 A1 * | 1/2009 | Knecht | ............... | G01M 3/2807 137/557 |
| 2011/0259437 A1 * | 10/2011 | Thomasson | ......... | F24D 19/1024 137/88 |
| 2012/0024390 A1 * | 2/2012 | Dopslaff | .............. | G05D 11/138 137/561 R |
| 2012/0031494 A1 | 2/2012 | Lymberopoulos | | |
| 2015/0122345 A1 * | 5/2015 | Sorensen | ................ | F16K 11/22 137/88 |
| 2018/0192167 A1 * | 7/2018 | Lange | ................ | G05D 23/1919 |

FOREIGN PATENT DOCUMENTS

| | | |
|---|---|---|
| DE | 10130862 A1 | 1/2003 |
| DE | 102005051279 A1 | 5/2007 |
| DE | 102016109959 A1 | 11/2017 |
| DE | 102017131076 A1 | 6/2019 |
| EP | 1203949 B1 | 11/2006 |
| WO | 2015109209 A2 | 7/2015 |

* cited by examiner

INTELLIGENT SAFETY VALVE AND CONTROL METHOD OF AN INTELLIGENT SAFETY VALVE

CROSS-REFERENCE TO RELATED APPLICATION

The present application is related to and claims the priority benefit of German Patent Application No. 10 2019 135 598.2, filed on Dec. 20, 2019, the entire contents of which are incorporated herein by reference.

TECHNICAL FIELD

The invention relates to an intelligent safety valve and a control method of an intelligent safety valve.

BACKGROUND

In analytical measurement technology, especially in the fields of water management, environmental analysis and in industry, for example in food technology, biotechnology and pharmaceuticals, as well as for various laboratory applications, measurands, such as the pH value, the conductivity or the concentration of analytes, such as ions or dissolved gases in a gaseous or liquid measurement medium, are of great importance. These measurands can be recognized and/or monitored, for example, by means of electrochemical sensors, such as potentiometric, amperometric, voltammetric or coulometric sensors, or even conductivity sensors.

To acquire the measurands, the sensor is brought into contact with the measurement medium via a sensor opening in, for example, a process tank or a process line. These sensor openings are connected via, for example, a flanged connection to, for example, a pipe of a process line, a valve for changing and controlling material flows, or other process components.

A disadvantage of such sensor openings is that they usually have a very complicated shape and, for insertion into for example a process line, the process line has to be disconnected and then has to be securely re-connected to the sensor opening. The use of a plurality of sensors is therefore associated with high manufacturing costs for the corresponding sensor openings. Similarly, when a plurality of sensor openings is used, the number of possible fault sources of leakages in, for example, process lines increases.

SUMMARY

It is therefore an object of the invention to provide a device which makes it possible to minimize the number of sensor openings.

This object is achieved according to the invention by an intelligent safety valve according to claim 1.

The intelligent safety valve according to the invention comprises:
- a valve body with a first valve inlet, a valve outlet and a first sensor compartment, the first sensor compartment including a first sensor assembly, the first sensor compartment being disposed in the valve housing,
- a first closing unit which is suitable for closing the intelligent safety valve,
- an actuator that is mechanically connected to the first closing unit in order to close the first closing unit,
- a control unit that is connected to the actuator and is suitable for controlling the actuator.

The control unit is connected to the first sensor assembly in order to evaluate sets of measured values of the first sensor assembly. The first sensor assembly comprises at least one analysis sensor, such as a pH sensor, a conductivity sensor, an oxygen sensor, or an optical sensor.

The intelligent safety valve according to the invention makes it possible to minimize the number of sensor openings required in a processing system, since existing connection points with valves for changing and controlling material flows can now also be used for measured value acquisition. The connection points in a process line or a process circuit are thus reduced, and potential points of leakage are thus reduced. The use of an intelligent safety valve also enables the number of complex components to be reduced or concentrated. This simplifies the maintenance of a processing system since the number of inspection points is reduced.

According to an embodiment of the invention, the control unit has a communication module and is suitable for communicating with a system external to the intelligent safety valve.

According to an embodiment of the invention, the communication module is a fieldbus interface, a network interface, or a wireless interface.

According to an embodiment of the invention, the valve body has a second valve inlet. The first closing unit is suitable for adjusting a pre-specified ratio of the openings between the first valve inlet and the second valve inlet.

According to an embodiment of the invention, the valve body has a second sensor compartment. The first sensor compartment is arranged at the valve outlet, and the second sensor compartment is arranged at the first valve inlet or the second valve inlet.

According to an embodiment of the invention, the analysis sensor comprises an ion-sensitive element. The ion-sensitive element is mounted on a substrate. The substrate preferably comprises enamel, ceramic, plastic or metal.

The above-mentioned object is also achieved according to the invention by a control method according to claim 7.

The control method according to the invention comprises the following steps:
- provision of an intelligent safety valve according to the invention,
- acquisition of a first set of measured values of the measurement medium by the first sensor assembly,
- comparison of the first set of measured values with a first set of limit values by means of the control unit,
- closure of the first closing unit by the actuator if the first set of measured values has exceeded the first set of limit values.

According to an embodiment of the invention, after the step of closing the first closing unit, the control method furthermore comprises the following steps:
- reception of an initiation signal from the control unit,
- opening the first closing unit, wherein the first closing unit is only partially opened,
- acquisition of a secondary set of measured values of the measurement medium by the first sensor assembly,
- comparison of the secondary set of measured values with the first set of limit values by means of the control unit,
- fully opening the first closing unit if the secondary set of measured values does not exceed the first set of limit values.

According to an embodiment of the invention, the intelligent safety valve has a second valve inlet, wherein the first closing unit is suitable for closing the first valve inlet and the second valve inlet independently of each other, wherein the valve body has a second sensor compartment and a second sensor assembly is arranged in the second sensor compartment, wherein the first sensor compartment is arranged at the first valve outlet and the second sensor compartment is arranged at the first valve inlet or the second valve inlet, the control method furthermore comprising the following steps:

acquisition of a second set of measured values of the measurement medium by the second sensor assembly, evaluation of the second set of measured values by the control unit, closure or opening of the first closing unit by the actuator depending on the evaluation of the second set of measured values.

According to an embodiment of the invention, a fluid line which transports an addition medium is connected to the second valve inlet, wherein the addition medium is suitable for changing the measurement medium in such a way that at least one measurand of the measurement medium can be adjusted by the addition medium, wherein the step of evaluating the second set of measured values comprises a step of comparing the second set of measured values with a set of setpoint values and a step of closing or opening the first closing unit in such a way that the set of setpoint values is approximated starting from the second set of measured values.

According to an embodiment of the invention, the intelligent safety valve has a communication module. The control method comprises a step of outputting an alarm signal if the first set of measured values has exceeded the first set of limit values.

According to an embodiment of the invention, the intelligent safety valve has a communication module and a closure switch. The closure switch is suitable for recognizing whether the first closing unit is closed. The control method comprises a step of outputting an alarm signal if the first set of measured values has exceeded the first limit value and the closure switch recognizes that the first closing unit is not closed.

BRIEF DESCRIPTION OF THE DRAWINGS

The invention will be explained in more detail on the basis of the following description of the figure. The following are shown.

DETAILED DESCRIPTION

Figure 1:
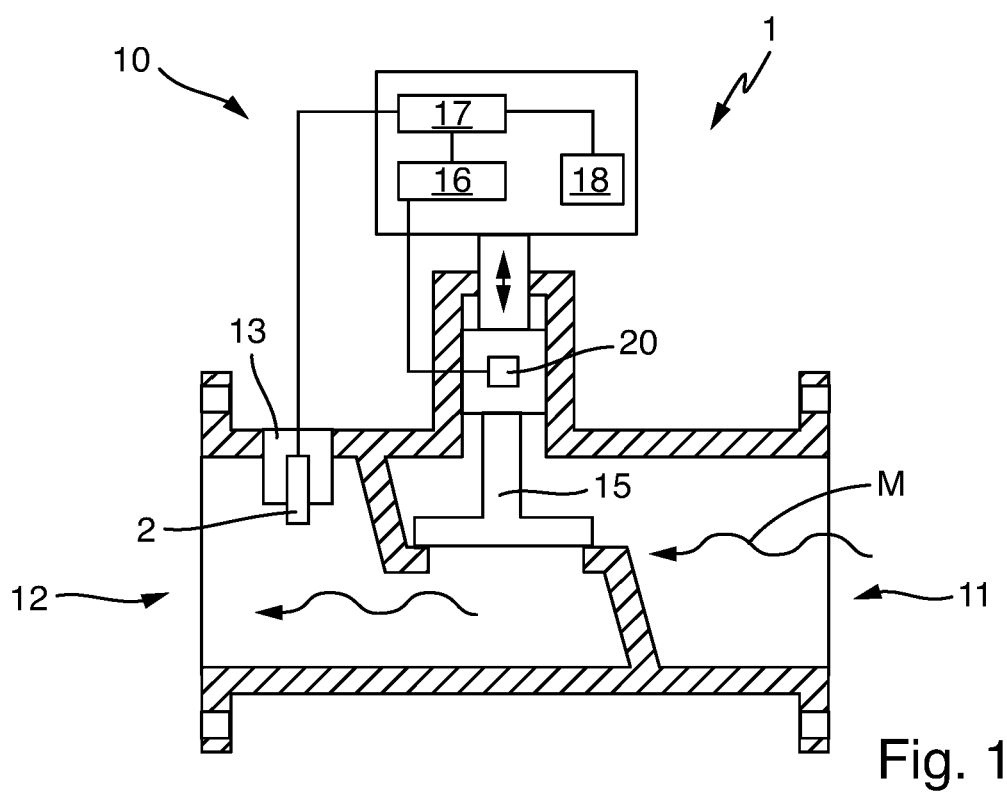
FIG. 1 shows a schematic representation of an intelligent safety valve according to the invention.

FIG. 1 shows an embodiment of an intelligent safety valve 1 which comprises a valve body 10, a first closing unit 15, an actuator 16, a control unit 17, a communication module 18 and a closure switch 20. The intelligent safety valve 1 is suitable for a measurement medium M to flow through. The intelligent safety valve 1 is suitable for being connected by means of a connecting element 5, for example, to a flange with a container, for example a pipe.

The valve body 10 has a first valve inlet 11, a valve outlet 12 and a first sensor compartment 13. The first sensor compartment 13 is arranged in the valve body 10 and is suitable for containing a first sensor assembly 2. The valve body 10 enables the first sensor assembly 2 to come into contact with a measurement medium in the interior of the valve body 10. The first sensor compartment 13 is preferably arranged in the vicinity of the valve outlet 12. Of course, the first sensor compartment 13 could also be arranged at the first valve inlet 11.

The first sensor assembly 2 comprises at least one analysis sensor. The first sensor assembly 2 may also comprise multiple analysis sensors. The analysis sensor is, for example, a pH sensor, a conductivity sensor or an oxygen sensor. The analysis sensor is, for example, an optical sensor. The analysis sensor is, for example, a turbidity sensor or an absorption sensor. If the analysis sensor is a pH sensor, it will preferably comprise an ion-sensitive element mounted on a substrate. The substrate preferably comprises enamel, ceramic, plastic or metal.

The first closing unit 15 is suitable for closing the intelligent safety valve 1. The first closing unit 15 is suitable for fully closing the intelligent safety valve 1, for example, so that no measurement medium is able to flow from the valve inlet 11 to the valve outlet 12. Alternatively, the first closing unit 15 is also suitable for partially closing the intelligent safety valve 1. The operating modes of the intelligent safety valve 1 will be discussed in detail further below. Changing and controlling material flows is achieved by means of the first closing unit 15.

The first closing unit 15 is mechanically connected to the actuator 16. The actuator 16 is suitable for opening and closing the first closing unit 15 or for partially opening or partially closing the first closing unit 15.

The control unit 17 is connected to the actuator 16 and is suitable for controlling the actuator 16. The control unit 17 is also connected to the first sensor assembly 2 in order to receive and evaluate sets of measured values from the first sensor assembly 2. If the first sensor assembly 2 comprises a plurality of sensors, the control unit 17 will of course be connected to each of the sensors and be suitable for simultaneously processing the sets of measured values from the sensors.

Furthermore, the control unit 17 is connected to the communication module 18. For example, the communication module 18 enables wireless communication with the external system or the external mobile device. Alternatively, however, the communication module 18 can also be connected to the external system via a fieldbus interface or a network interface. The communication module 18 enables the sets of measurement values to be communicated to an external system or an external mobile device. The communication module 18 further enables, for example, a current position or a history of the past positions of the first closing unit 15 to be communicated to a user, or for the user to make certain adjustments to the intelligent safety valve 1, for example to define sets of limit values. The sets of limit values will be discussed further below.

Figure 2:
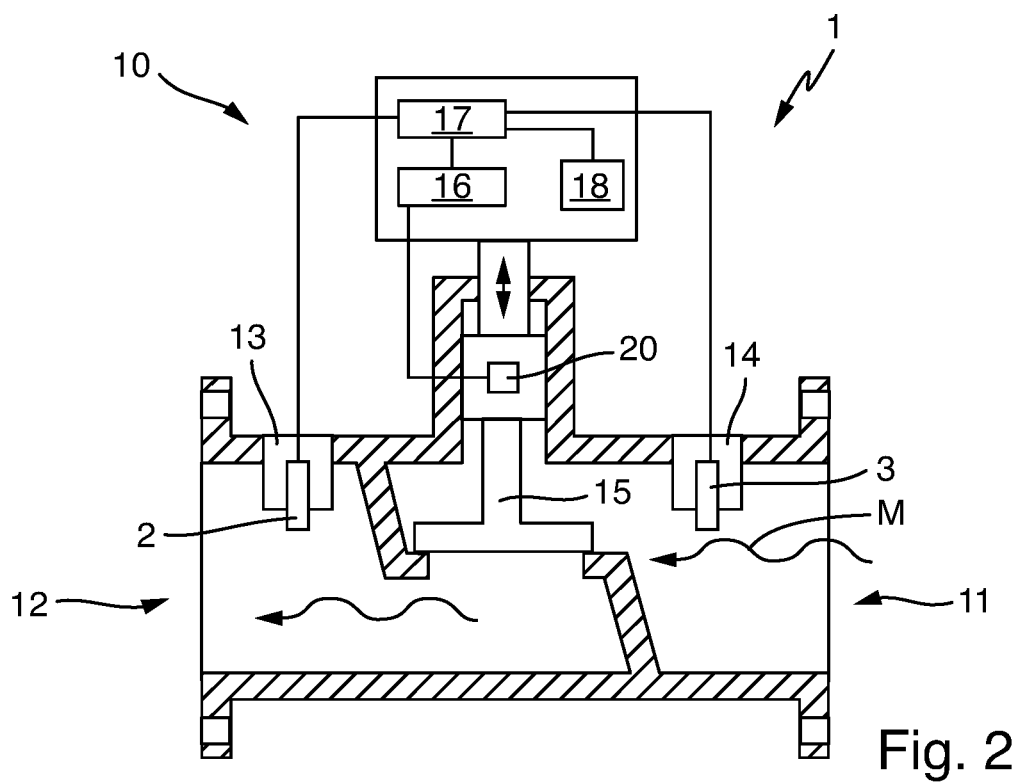
FIG. 2 shows a schematic representation of an embodiment of the intelligent safety valve shown in FIG. 1.

FIG. 2 shows another embodiment that is compatible with the embodiment described above. In this further embodiment, the valve body 10 additionally has a second sensor compartment 14 in which a second sensor assembly 3 is arranged. The second sensor compartment 14 is preferably arranged in the vicinity of the first valve inlet 11.

The second sensor assembly 3 is connected to the control unit 17 in order to receive and evaluate sets of measured values from the second sensor assembly 3.

Figure 3:
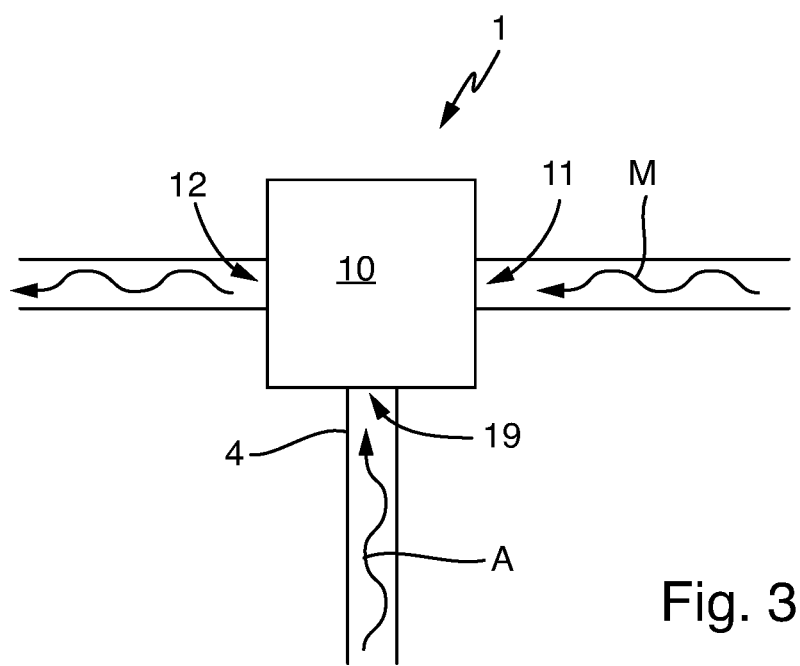
FIG. 3 shows a schematic representation of a further embodiment of the intelligent safety valve shown in FIG. 1.

FIG. 3 shows a schematic view of a further embodiment of the intelligent safety valve 1 that is compatible with the above-described embodiments. In this further embodiment, the valve body 10 has the intelligent safety valve 1 and a second valve inlet 19. For example, a further pipe can be connected to the second valve inlet 19 in order, for example, to admix an addition medium A with the measurement medium M.

The second valve inlet 19 is arranged in such a way that the second valve inlet 19 is suitable for being closed or partially closed by the first closing unit 15. The first closing unit 15 is preferably designed in such a way that the first valve inlet 11 and the second valve inlet 19 can be closed independently of each other by the first closing unit 15. This means that a volume flow of the measurement medium M and a volume flow of the addition medium A can be adjusted in any desired ratio. A total passage opening defined by the first valve inlet 11 and the second valve inlet 19 can thus be closed as desired by the first closing unit 15.

In an alternative embodiment (not shown), the intelligent safety valve 1 comprises a second closing unit which is suitable for closing the second valve inlet 19 and which is connected to the control unit 17 and whose opening is controlled by a further actuator.

In an alternative embodiment (not shown), the first closing unit 15 comprises the second closing unit. This means that the first closing unit 15 is constructed in two parts. The second closing unit is suitable for closing the second valve inlet 19.

FIG. 1 and FIG. 2 show a closure switch 20 which is suitable for recognizing the position of the first closing unit 15. For example, the closure switch 20 recognizes whether the first closing unit 15 is closing the first valve inlet 11 and/or the second valve inlet 19. If a second closing unit is used, the closure switch 20 will also make it possible to recognize the position of the second closing unit.

The control method of the intelligent safety valve 1 is described below.

In a first step, the intelligent safety valve 1 described above is provided. This means that the intelligent safety valve 1 is ready for use, i.e. is installed, for example, in a processing system. The first valve inlet 11 and the valve outlet 12 are connected, for example, to a tank, a reactor, a clarification basin or a pipe in which the measurement medium M is located.

Next, a first set of measured values of the measurement medium M is acquired by the first sensor assembly 2. Depending on the first sensor assembly 2, the set of measured values will be, for example, a pH value, a conductivity value, an oxygen content or another measured value. Depending on the number of sensors arranged in the first sensor compartment 13, the first set of measured values will comprise a plurality of first measured values.

The first set of measured values is then compared with the first set of limit values by the control unit 17. The first set of limit values is stored in the control unit 17, for example in a memory (not shown), and comprises a first limit value or a plurality of first limit values. The first set of limit values may be adjusted by the user, for example, via the communication module 18.

In a next step, the first closing unit 15 is closed by the actuator 16 if the first set of measured values has exceeded the first set of limit values. "Exceeded" is to be understood here in a broader sense. This means that the first set of limit values is overshot or undershot. If the first set of limit values comprises a plurality of first limit values and the first set of measured values comprises a plurality of first measured values, but only one first limit value has been exceeded by a first measured value, it will nevertheless be possible for the first closing unit 15 to be closed. In addition, an alarm signal may be output, for example, via the communication module 18.

A step of receiving an initiation signal from the control unit 17 is then carried out. The initiation signal is, for example, an input of a user via a mobile communication unit or a control system which is connected to the communication module 18 by information technology. Alternatively, the initiation signal can also be generated by the control unit 17 itself.

Once the initiation signal has been successfully received, a step of opening the first closing unit 15 takes place. When opening, the first closing unit 15 is preferably only partially opened. In this way, only a small proportion of measurement medium M can advance to the valve outlet 12 and to the first sensor assembly 2. A certain time span preferably elapses before the opening step is carried out. For example, the reason for the first set of limit values being exceeded can be investigated. The first closing unit 15 is preferably opened for a prespecified period of time.

Then a secondary set of measured values of the measurement medium M is acquired by the first sensor assembly 2. The secondary set of measured values can have a plurality of secondary measured values corresponding to the first set of measured values.

The secondary set of measured values is then compared with the first set of limit values by the control unit 17. A kind of test measurement is thus carried out in order to check whether the measurement medium M now has sets of measured values which do not exceed the first set of limit values. If the measurement medium M still has sets of measured values which exceed the first set of limit values, the first closing unit 15 will be closed again. If the measurement medium M has sets of measured values which no longer exceed the first set of limit values, the first closing unit 15 will be opened, preferably fully opened.

In the embodiment described above, in which the intelligent safety valve 1 has a second valve inlet 19, the control method comprises further optional steps. These optional steps may take place in parallel with the steps described above. The optional steps may also be carried out after or before the steps described above.

In one optional step, a second set of measured values of the measurement medium M is determined by the second sensor assembly 3. The second set of measured values can have a plurality of second measured values corresponding to the first set of measured values and to the secondary set of measured values.

The second set of measured values is subsequently evaluated by the control unit 17. Then, depending on the evaluation of the second set of measured values, the first closing unit 15 will be closed or partially closed by the actuator 16.

FIG. 3 shows that a fluid line 4 which transports an addition medium A is connected to the second valve inlet 19. The addition medium A is preferably suitable for changing the measurement medium M in such a way that at least one measurand of the measurement medium M can be adjusted by the addition medium A. For example, the addition medium A is suitable for adjusting the pH value of the measurement medium M. Additionally or alternatively thereto, the addition medium A is suitable for adjusting the conductivity and/or the oxygen content of the measurement medium M.

The step of evaluating the second set of measured values preferably comprises a step of comparing the second set of measured values with a set of setpoint values. The step of evaluating also comprises a step of closing or opening the first closing unit 15 in such a way that the set of setpoint values is approximated starting from the second set of measured values. This means, for example, that when a pH value is measured which is slightly below a pH setpoint value, the first closing unit 15 will only be slightly closed or opened depending on the extent to which the addition medium A influences the measurement medium M. For example, if the addition medium A has a pH-lowering effect, the first closing unit 15 would be closed slightly. A control loop is thus generated. By this kind of regulation, for example, a safe pH value is achieved.

As described above, the intelligent safety valve 1 may have a closure switch 20. In this case, the control method optionally comprises a step of outputting an alarm signal if the first set of measured values has exceeded the first limit value and the closure switch 20 recognizes that the first closing unit 15 is not closed. This makes it possible to quickly recognize an error state of the intelligent safety valve 1.

The invention claimed is:
1. An intelligent safety valve, comprising:
  a valve body having a first valve inlet, a valve outlet, and a first sensor compartment, the first sensor compartment including a first sensor assembly, the first sensor compartment being arranged in the valve body;
  a first closing unit suitable for closing the intelligent safety valve;
  a closure switch configured to recognize whether the first closing unit is closed;
  an actuator mechanically connected to the first closing unit to close the first closing unit;
  a control unit connected to the actuator and suitable for controlling the actuator; and
  a communication module,
  wherein the control unit is connected to the first sensor assembly to evaluate sets of measured values from the first sensor assembly,
  wherein the first sensor assembly comprises at least one analysis sensor, and
  wherein the intelligent safety valve is configured to:
    acquire a first set of measured values of a measurement medium via the first sensor assembly,
    compare the first set of measured values with a first set of limit values by means of the control unit,
    close the first closing unit by the actuator when the first set of measured values has exceeded the first set of limit values, and
    output an alarm signal when the first set of measured values has exceeded the first set of limit values and the closure switch recognizes that the first closing unit is not closed.
2. The intelligent safety valve according to claim 1, wherein the communication module is suitable for communicating with a system external to the intelligent safety valve.
3. The intelligent safety valve according to claim 2, wherein the communication module is a fieldbus interface, a network interface, or a wireless interface.
4. The intelligent safety valve according to claim 1, wherein the valve body further has a second valve inlet, wherein the first closing unit is suitable for adjusting a pre-specified ratio of the openings between the first valve inlet and the second valve inlet.
5. The intelligent safety valve according to claim 4, wherein the valve body further has a second sensor compartment, and wherein the first sensor compartment is arranged at the valve outlet and the second sensor compartment is arranged at the first valve inlet or at the second valve inlet.

6. The intelligent safety valve according to claim 1, wherein the analysis sensor comprises an ion-sensitive element, wherein the ion-sensitive element is mounted on a substrate.
7. A control method of an intelligent safety valve comprising:
  providing an intelligent safety valve, the intelligent safety valve including:
    a valve body having a first valve inlet, a valve outlet, and a first sensor compartment, the first sensor compartment including a first sensor assembly, the first sensor compartment being arranged in the valve body;
    a first closing unit suitable for closing the intelligent safety valve;
    a closure switch configured to recognize whether the first closing unit is closed;
    an actuator mechanically connected to the first closing unit to close the first closing unit;
    a control unit connected to the actuator and suitable for controlling the actuator; and
    a communication module,
    wherein the control unit is connected to the first sensor assembly to evaluate sets of measured values from the first sensor assembly,
    wherein the first sensor assembly comprises at least one analysis sensor, and
    wherein the intelligent safety valve is configured to:
      acquire a first set of measured values of a measurement medium via the first sensor assembly,
      compare the first set of measured values with a first set of limit values by means of the control unit,
      close the first closing unit by the actuator when the first set of measured values has exceeded the first set of limit values, and
      output an alarm signal if the first set of measured values has exceeded the first limit value and the closure switch recognizes that the first closing unit is not closed;
  acquiring a first set of measured values of the measurement medium by the first sensor assembly;
  comparing the first set of measured values with a first set of limit values by means of the control unit;
  closing the first closing unit by the actuator when the first set of measured values has exceeded the first set of limit values; and
  outputting an alarm signal when the first set of measured values has exceeded the first set of limit values and the closure switch recognizes that the first closing unit is not closed.
8. The control method according to claim 7, further comprising after the step of closing the first closing unit:
  receiving an initiation signal from the control unit;
  opening the first closing unit, wherein the first closing unit is only partially opened;
  acquiring a secondary set of measured values of the measurement medium by the first sensor assembly;
  comparing the secondary set of measured values with the first set of limit values by means of the control unit; and
  fully opening the first closing unit if the secondary set of measured values does not exceed the first set of limit values.
9. The control method according to claim 7,
  wherein the intelligent safety valve has a second valve inlet, wherein the first closing unit is suitable for controlling the first valve inlet and the second valve inlet independently of each other, wherein the valve body has a second sensor compartment and a second sensor assembly is arranged in the second sensor compartment, and wherein the first sensor compartment is arranged at the valve outlet and the second sensor compartment is arranged at the first valve inlet or at the second valve inlet, the control method further comprising:

acquiring a second set of measured values of the measurement medium by the second sensor assembly;

evaluating the second set of measured values by the control unit; and closing or opening the first closing unit by the actuator depending on the evaluation of the second set of measured values.

10. The control method according to claim 9, wherein a fluid line which transports an addition medium is connected to the second valve inlet, wherein the addition medium is suitable for changing the measurement medium such that at least one measurand of the measurement medium can be adjusted by the addition medium, wherein the step of evaluating the second set of measured values includes a step of comparing the second set of measured values with a set of setpoint values and a step of closing or opening the first closing unit in such a way that the set of setpoint values is approximated starting from the second set of measured values.

* * * * *